US011953862B2

(12) United States Patent
Clark, Jr. et al.

(10) Patent No.: US 11,953,862 B2
(45) Date of Patent: Apr. 9, 2024

(54) OPTIMAL CONTROL CONFIGURATION ENGINE IN A MATERIAL PROCESSING SYSTEM

(71) Applicant: The Boston Consulting Group, Inc., Boston, MA (US)

(72) Inventors: John Thomas Clark, Jr., North Salt Lake, UT (US); Joakim Kalvenes, Glencoe, IL (US); Jason Thomas Stewart, Venice, IL (US); Rohin Wood, Perth (AU)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 225 days.

(21) Appl. No.: 17/520,551

(22) Filed: Nov. 5, 2021

(65) Prior Publication Data

US 2023/0039441 A1 Feb. 9, 2023

Related U.S. Application Data

(60) Provisional application No. 63/229,931, filed on Aug. 5, 2021.

(51) Int. Cl.
*G05B 13/02* (2006.01)
*G05B 13/04* (2006.01)

(52) U.S. Cl.
CPC ....... *G05B 13/0265* (2013.01); *G05B 13/042* (2013.01); *G05B 13/048* (2013.01)

(58) Field of Classification Search
CPC . G05B 13/0265; G05B 13/042; G05B 13/048
See application file for complete search history.

(56) References Cited

U.S. PATENT DOCUMENTS

2014/0343695 A1* 11/2014 Di Cairano .......... G05B 13/048
700/29
2017/0234559 A1* 8/2017 Federspiel ............... F24F 11/32
700/278

(Continued)

OTHER PUBLICATIONS

Judea Pearl, The Do-Calculus Revisted, Aug. 17, 2022, UAI-2012 Conference (Year: 2012).*

(Continued)

*Primary Examiner* — Christopher E. Everett
*Assistant Examiner* — Tameem D Siddiquee
(74) *Attorney, Agent, or Firm* — Fish & Richardson P.C.

(57) ABSTRACT

Methods, systems, and computer storage media for providing an optimal control configuration for a material processing system are provided. In operation, a material processing engine accesses causal graph input data. Causal graph input data includes input data of a continuous flow process. Based on the causal graph and the input data, a causal graph that aligns with do-calculus manipulations—associated with determining identifiable causal relationships corresponding to input materials of the continuous flow process—is generated. The causal graph is parsed based on the do-calculus manipulations to determine valid conditioning sets associated with estimating a causal impact on an optimization target. Based on the valid conditioning sets, an optimal control configuration comprising optimal control variable values is generated. Generating the optimal control configuration comprising the optimal control variable values associated with the continuous flow process is based on solving a deterministic convex optimization problem and a corresponding stochastic optimization problem.

15 Claims, 9 Drawing Sheets

(56) References Cited

U.S. PATENT DOCUMENTS

2019/0294740 A1* 9/2019 Matsubara ............. G06Q 10/04
2022/0343193 A1* 10/2022 Sharma ............. G05B 23/0275

OTHER PUBLICATIONS

Chen et al., Distributed System Monitoring and Fault Diagnosis Based on Causal Graphical Model, Sep. 30, 2019, 2019 1st International Conference on Industrial Artificial Intelligence (IAI) (Year: 2019).*

* cited by examiner

OPTIMAL CONTROL CONFIGURATION ENGINE IN A MATERIAL PROCESSING SYSTEM

CROSS-REFERENCE SECTION

The present application claims the benefit of U.S. Provisional Application No. 63/229,931, filed Aug. 5, 2021 and entitled "OPTIMAL CONTROL CONFIGURATION ENGINE IN A MATERIAL PROCESSING SYSTEM", the entirety of which is incorporated by reference herein.

BACKGROUND

Many companies rely on material processing systems to produce goods from raw materials. Material processing systems implement manufacturing processes that include steps through which raw materials are transformed into a final product. For example, a manufacturing process can be a mining process for extracting valuable minerals or other geological materials from ores. A material processing system can operate based on mining process configurations that can include control schemes with several control variables, where each control variable may be interdependent and have an effect on the objective or desired outcome of a process. For example, raising the temperature—a first control variable—of a sealed vessel in a manufacturing process can also cause the pressure—a second control variable—to increase.

Conventionally, material processing systems are not configured with a computing infrastructure and logic to calculate or estimate values of control variables based on accurate relationships between control variables. For example, a black-box machine learning model of a conventional material processing system may be used to correlate values for a set of control variables—of a control scheme—so that an optimal outcome is achieved. While control variables in control schemes can be configured based on values of correlated controls, the correlated controls fall short in producing optimal values because correlation merely identifies a relationship between the correlated control without demonstrating a particular cause-effect relationship of a first control variable on a second control variable. As such, a more comprehensive material processing system—having an alternative basis for providing material processing system configurations and operations—can improve processing techniques provided using material processing systems.

SUMMARY

Various aspects of the technology described herein are generally directed to systems, methods, and computer storage media, for among other things, providing an optimal control configuration for an optimal control configuration engine of a material processing system. The optimal control configuration can refer optimal to optimal set points for control variables given the system state of variables. The optimal control configuration identifies inputs that are used to manage, direct or regulate behavior of components in the material processing system. The optimal control configuration is generated based on causal intervention determination, linkages between control variables through time, physical processes that align with first principles, a plurality of machine learning models, and an uncertainty measure associated with risk adjustment.

In operation, a causal intervention determination can be made for a continuous flow process of the material processing system, where the causal intervention determination is made based on non-experimental data and input materials of the continuous flow process. The causal intervention determination uses estimates of one or more causal relationships between control variables and an optimization target. The causal intervention determination is based on do-calculus that facilitates identification of causal effects in non-parametric models. Do-calculus includes interference rules that permit mapping interventional and observation distributions whenever certain conditions hold in a causal graph, as discussed in more detail below.

The causal intervention determination accounts for linkages between control variables through time in the continuous flow process—and also known theoretical impacts of the physical processes in the continuous flow process—such that, the optimal control configuration (e.g., recommended inputs for components of the material processing system) are aligned with first principles (i.e., foundational propositions or assumptions). It is contemplated that the optimal control configuration can be dynamic in that the optimal control changes as input materials into the material processing system changes. The material processing system operates based on machine learning models that generate inputs for computing the optimal control configuration for the continuous flow process. The optimal control configuration can be computed with some level of uncertainty (e.g., objective parameters and constraint parameters that are not observed and remain unknown). The level of uncertainty can further be used to produce a risk-adjusted optimal control configuration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Overview

Figure 1A:
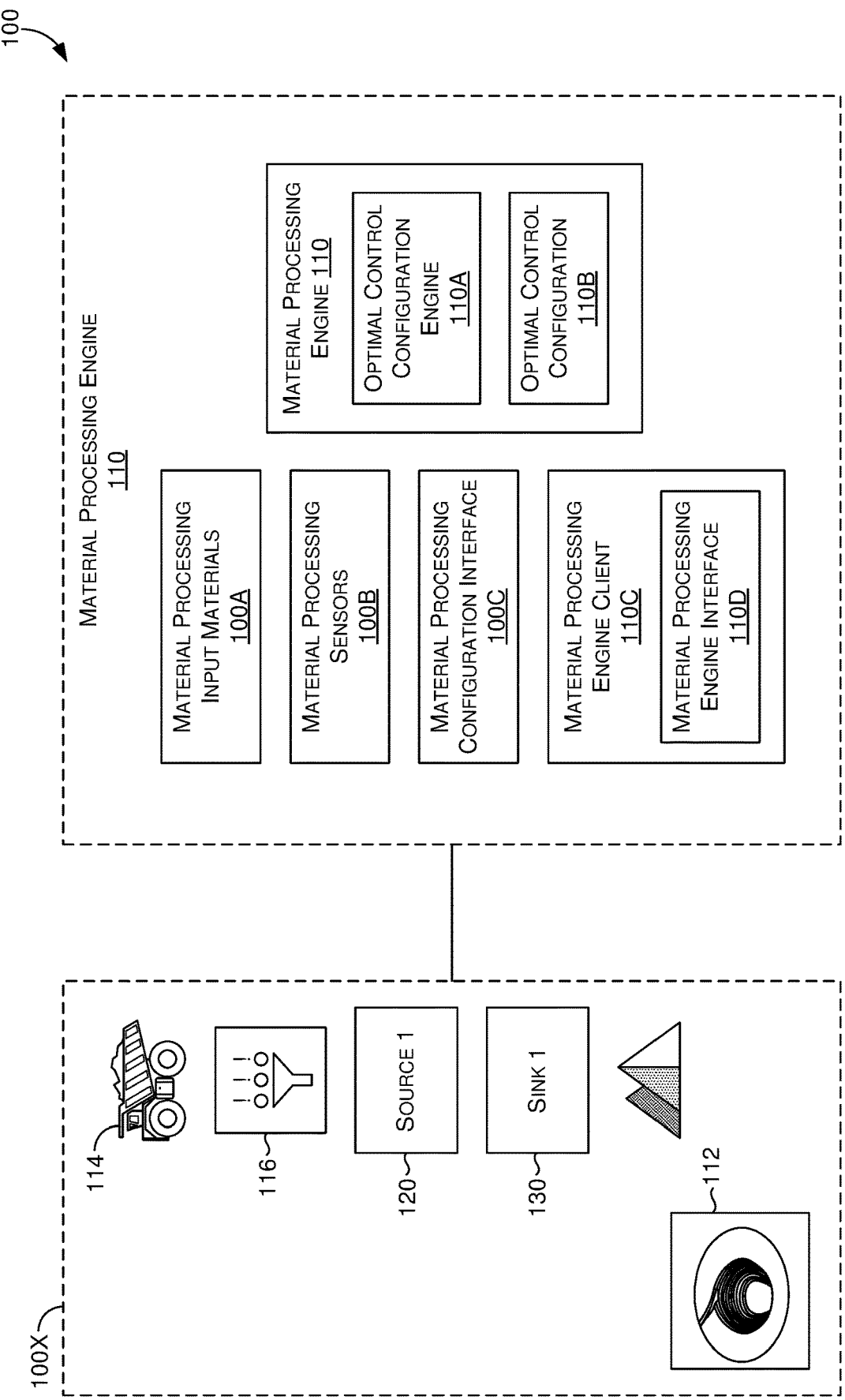
FIGS. 1A and 1B are block diagrams of an exemplary material processing system with a material processing engine, in which embodiments described herein may be employed.

By way of background, a material processing system can be associated with an industrial environment that manages continuous flow of a material as the material is being processed. The material processing system can refer to a complex physical manufacturing system or mining processing system that supports continuous flow of a particular material. During the continuous material flow, the material processing system can extract a particular material property from the material. For example, the material processing system can include components that support extracting a valuable mineral from ores that are in a continuous flow process in the material processing system. The material processing system can also include on-premise gathering of data. Data can be gathered—using sensors and computing components where computing components process the data—to improve the material processing system. For example, sensors can measure different types of variables—including temperature, vibrations, acidity—where the data is gathered and stored in a database.

Conventionally, material processing systems may use traditional optimization techniques for generating optimal controls; however traditional techniques rely on machine learning models that have several limitations in the material processing context. For example, while optimal controls can be generated using recommendation techniques that include a first step of creating a representation of the physical world as a model (e.g., a manufacturing process) and a second step of employing the model to compute a recommendation (e.g., a control variable setting recommendation). Nonetheless, conventional material processing systems may support process optimization via machine learning models that naively are based exclusively on correlated data.

Moreover, machine learning models, in conventional material processing systems, may actually identify situations of reverse causality and make erroneous recommendations for optimal controls that result in the opposite intended outcome. In this way, standard machine learning models can lead to wrong conclusions and wrong recommendations when sensing data that is continuous in time. In particular, standard machine learning models do not include computations to avoid strong auto-correlation between factors, as such, have difficulty identifying situations of reverse causation in material processing—especial in continuous flow processes.

Standard machine learning models also operate based on static data—in contrast to graph data—with no lower or higher variables with regard to correlating to a target. As such, while the machine learning model can provide a correct prediction of an outcome, the machine learning model does not provide information on how to manipulate a particular process in a material processing system. In addition, with modeling the physical process, even if a reverse causal relationship is determined, there exists no data to resolve the reverse causal relationship's impact on the machine learning model. As such, a more comprehensive material processing system—having an alternative basis for providing material processing system configurations and operations—can improve processing techniques provided using material processing systems.

Embodiments of the present disclosure are directed to providing an optimal control configuration for an optimal control configuration engine for a material processing system. The optimal control configuration can refer optimal to optimal set points for control variables given the system state of variables. The optimal control configuration identifies inputs that are used to manage, direct or regulate behavior of components in the material processing system. The optimal control configuration is generated based on causal intervention determination, linkages between control variables through time, physical processes that align with first principles, a plurality of machine learning models, and an uncertainty measure associated with risk adjustment.

Operationally, a material processing engine can process different inputs that support generating and implementing an optimal control configuration. The inputs (i.e., input data) can include a description of a circuit design and an operational configuration of a manufacturing process (e.g., mining process); a template of prior hypotheses, for example, a range within which a control variable's convex minimum lies; and system state variable values for a time period in which to make an optimal control configuration recommendation as output. The material processing engine processes the different inputs to generate the optimal control configuration that indicates optimal set points for each control variable give the system state variables.

The material processing engine can access causal graph input data. Causal graph input data can include control and system state variables (including input materials) and non-experimental data of a continuous flow process being optimized. Based on the causal graph input data, a causal graph—that aligns with do-calculus manipulations associated with determining identifiable causal relationships corresponding to input materials of the continuous flow process—can be generated. Do-calculus includes rules for transformation of conditional probability expressions involving a do-operator, such that, a causal model can be generated. The causal model supports generating the optimal control configuration based on identifying which control variables can be included or controlled. As such, the causal graph operates as a probabilistic graphic model that is used to encode assumptions about the continuous flow process.

The causal graph can be parsed based on the do-calculus manipulations to determine valid conditioning sets associated with estimating a causal impact on an optimization target. Estimating the causal impact can be based on panel data that includes multi-dimensional data involving measurements over a period of time of the continuous flow process. A minimum valid conditioning set is selected for the valid conditioning sets to generate a most simple valid solution. Causal theory is based on creating graphs of variables in which the lines of causality are clearly imposed based on theoretical considerations. Once this graph has been created, depending on the structure of the graph and the variable of interest (for which an estimate of a causal impact needs to be determined), there may be multiple valid conditioning sets to estimate the causal impact. For example, it may be not-valid to regress A on B but valid to regress it on C or D/E. In this case C would be the most simple valid solution as it is valid and has the fewest variables.

The material processing engine can then be used to partition the control variables into separate regimes.

Regimes can refer to different operating conditions of the continuous flow process (i.e., non-control variables) in which the optimal control configuration should be different. For each regime and for each control variable, the material processing engine uses a shortest valid conditioning set and a template prior hypothesis—as inputs—for training a Bayesian regression using a Markov chain Monte Carlo sampling. The Bayesian approach to linear regression can include statistical analysis that is undertaken within the context of Bayesian inference and the Markov chain Monte Carlo (MCMC) technique can include class of algorithms for sampling from a probability distribution. By constructing a Markov chain that has the desired distribution as its equilibrium distribution, a sample of the desired distribution can be obtained based on recording states from the chain. The more steps are included, the more closely the distribution of the sample matches the actual desired distribution.

Training the Bayesian regression results in learning a quadratic causal impact of the control variable on an optimization target. For example, a quadratic causal impact can include a Bayesian structural time series model based on multiple comparable control groups and uses the model to project a series of the baseline values for the time period after the event. It essentially takes one instance and then compares it to a new timeframe by factoring in differences in variables in that new time frame. In this way, the optimal control configuration can include a first control variable value and a second control variable value, where the first control variable value and the second control variable value are associated with corresponding machine learning models that have learned a quadratic causal impact—of the first control variable and second control variable, respectively—on the optimization target. Operationally, the material processing engine can repeat the training for any unknown constraint parameters.

The material processing engine can further support validation operations that quantify the divergence between the learned quadratic parameters of the control variable and the observed data. The validation operations also support confirming that the causal relationship aligns with first principles. The material processing engine can also support rescaling and recombining quadratic parameters of the quadratic parameters. The rescaled quadratic parameters can be recombined into a set of quadratic equations including all control variables—one for each operating regime.

The rescaled objective functions and constraint function can be converted into symbolic equations using a symbolic computing library. A function composition utility of the symbolic library can be used to construct nested objective and constraint functions to solve for linkages through time. In particular, for a regime—corresponding to state variables of a current time—regime optimization operations and learned constraints functions can be construct a deterministic convex optimization problem associated with minimizing convex functions over convex sets.

The deterministic convex optimization problem can be solved, such that, the optimal control variable values and constraint dual values are recorded. A convex optimization problem can refer to an optimization problem in which the objective function is a convex function and the feasible set is a convex set. The constraint dual values—constraints of the original problem—can refer to a measure of an increase in the function's value per unit increase in the control variable's value. The solution of the deterministic convex optimization problem and standard deviations of estimated quadratic parameters of each control variable are used to formulate a stochastic optimization counterpart to the deterministic formulation. In this way, the control variables can be optimized to improve the optimization target, while minimizing the probability of decreasing system performance in any single period. The stochastic optimization can be solved and the optimal control variable values and constraint dual values recorded in an optimal control configuration. As such, the material processing engine supports generating an optimal control configuration comprising optimal control variable values associated with the continuous flow process.

Figure 1B:
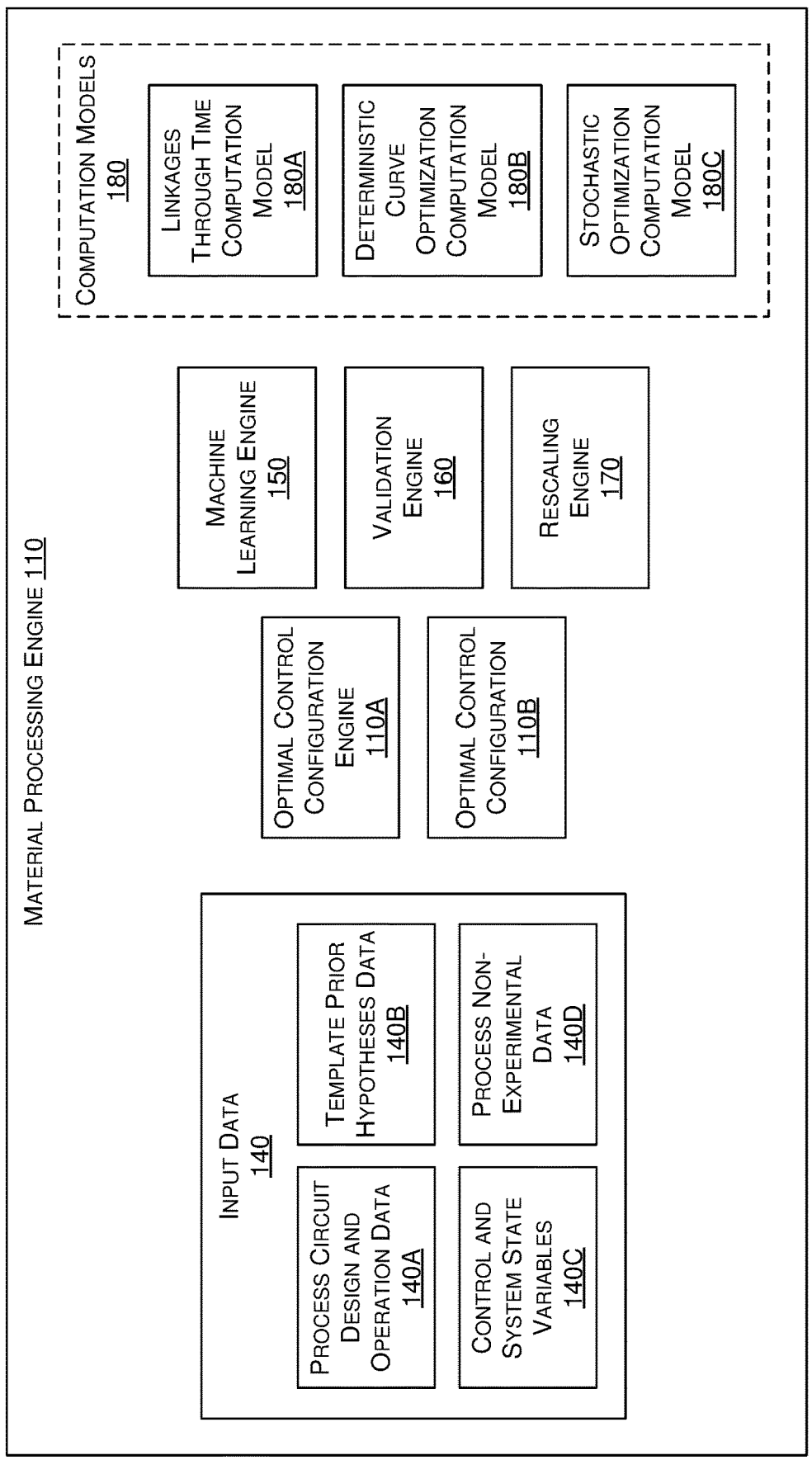

Aspects of the technical solution can be described by way of examples and with reference to FIGS. 1A, 1B, and 1C. FIG. 1A illustrates a material processing system 100 (e.g., mining process system 100X having pit 112, truck 114, crusher 116, source 1 120, sink 1 130)-. The material processing system 100 further includes material processing input materials 100A, material processing sensors 100B, material processing configuration interface 100C, material processing engine client 110C, and material processing engine interface 110D. The material processing system 100 also includes material processing engine 110 having an optimal control configuration engine 110A and optimal control configuration 110B.

The material processing system 100 provides an operating environment for processing a material (e.g., ore from the plurality of sources to the plurality of sinks). The material processing system 100, for example, can support a mining operation for the extraction of valuable minerals or other geological materials from a pit (e.g., pit 112) transported for processing using trucks (e.g., truck 114). For example, ores recovered by mining include metals, coals, oil; however, mining in a wider sense can include extraction of different types of materials. The material processing system 100 includes the material processing engine 110 that supports hardware and software operations in material processing system. For example, the material processing engine 110 can help receive and communicate configurations (e.g., optimal control configuration 110B) and controller signals (e.g., via material processing sensors 100B, material processing configuration interface 110C, and material processing engine client 110C) to support a continuous flow processing of a material. Other variations and combinations of material processing systems and physical manufacturing processes are contemplated with embodiments described herein The material processing engine 110 can include the optimal control configuration engine 110A associated with optimal control configuration 110B as described herein in more detail. The material processing engine 110 can operate the optimal control configuration engine 110A to support the functionality associated with the material processing engine 110 to provide the optimal control configuration described herein. And, the material processing engine 110 can operate with a material processing engine client 110C that is operationally coupled to a material processing engine interface 110D. The material processing engine client 110C can be a device that provides an interface for assisting (e.g., material processing system operators) with user interactions with the material processing engine 110 and other components of the material processing system 100. The material processing engine client 110C can be part of an optimization platform that supports generating configuration files (e.g., optimal control configuration, blending flow configuration files, or overflow management configurations files) that can be used as input and controls for components of the material processing system 100. Other variations and combination of material processing engines and materials processing engine clients for generating and implementing configurations associated with components a material processing system are contemplated with embodiment described herein.

With reference to FIG. 1B, FIG. 1B illustrates aspects of the material processing engine 110. FIG. 1B includes input data 140 having process circuit design and operation data 140A, template prior hypotheses data 140B, control and system state variables 140C, process non-experimental data 140D; optimal control configuration engine 110A; optimal control configuration 110B; machine learning engine 150, validation engine 160, rescaling engine 170, linkages through time computation model 180A, deterministic curve optimization computation model 180B, and stochastic optimization computation model 180C.

In operation, the machine processing engine 110 is responsible for making a causal intervention determination for a continuous flow process of the material processing system 100. The causal intervention determination is made based on input data including circuit design and operation data 140A, template prior hypotheses data 140B, control and system state variables 140C, process non-experimental data 140D. The causal intervention determination estimates one or more causal relationships between control variables and an optimization target of the continuous flow process. The causal intervention determination is based on do-calculus that facilitates identification of causal effects in non-parametric models. Do-calculus includes interference rules that permit mapping interventional and observation distributions whenever certain conditions hold in a causal graph.

Using the machine learning engine 150, validation engine 160, rescaling engine and computation models 180, the causal intervention determination accounts for linkages between control variables through time in the continuous flow process and also known theoretical impacts of the physical processes in the continuous flow process—such that—the optimal control configuration (e.g., recommended inputs for components of the material processing system) are aligned with first principles (i.e., foundational propositions or assumptions). It is contemplated that the optimal control configuration is dynamic and changes as input materials into the material processing system changes. The machine learning engine 150 includes machine learning models that generate inputs for providing the optimal control configuration for the continuous flow process with some level of uncertainty (e.g., objective parameters and constraint parameters that are not observed and remain unknown). The level of uncertainty can further be used to produce a risk-adjusted optimal control configuration.

Figure 2A:
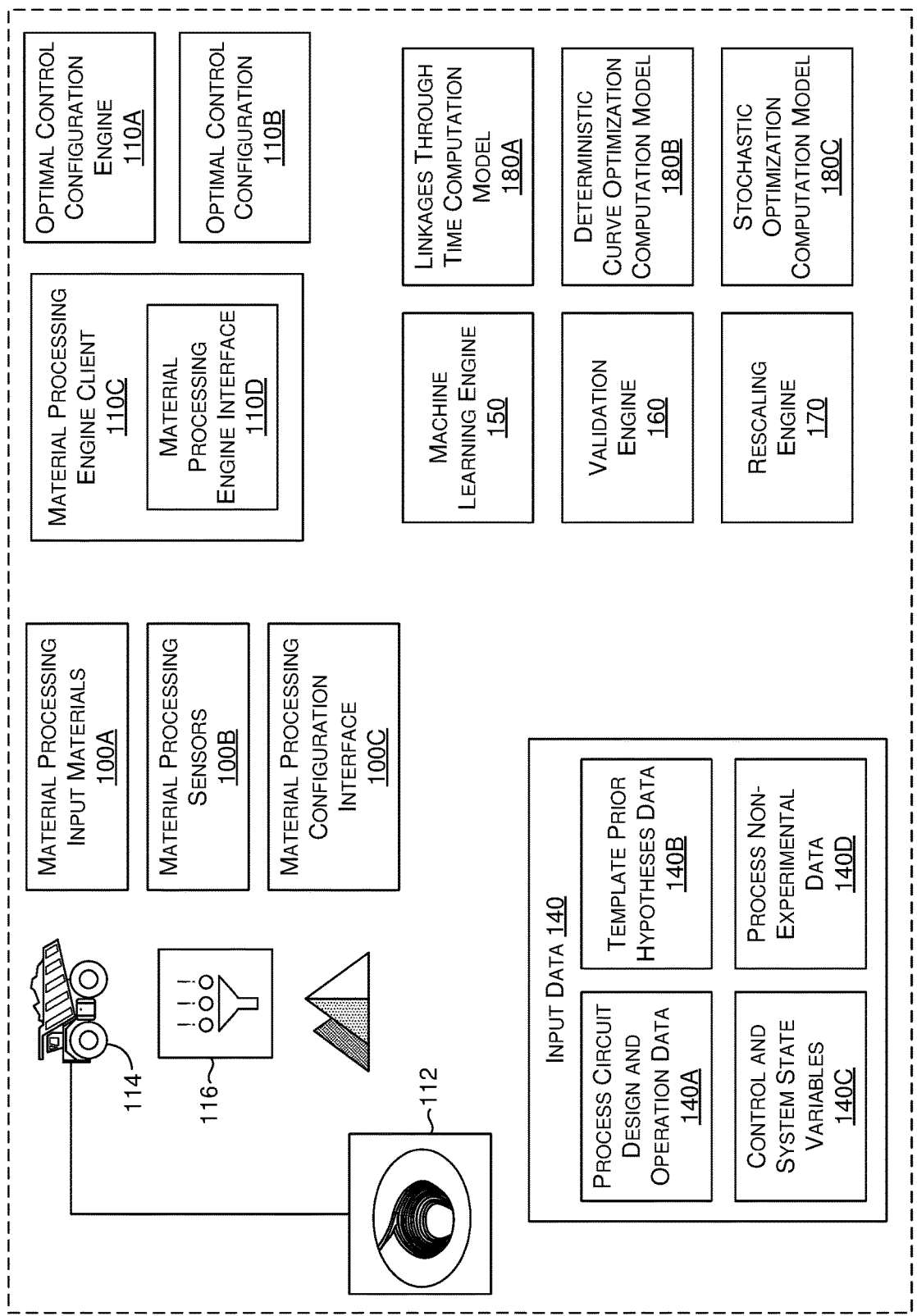
FIG. 2A is a block diagram of an exemplary material processing system with an optimal control configuration engine, in which embodiments described herein may be employed.
Figure 2B:
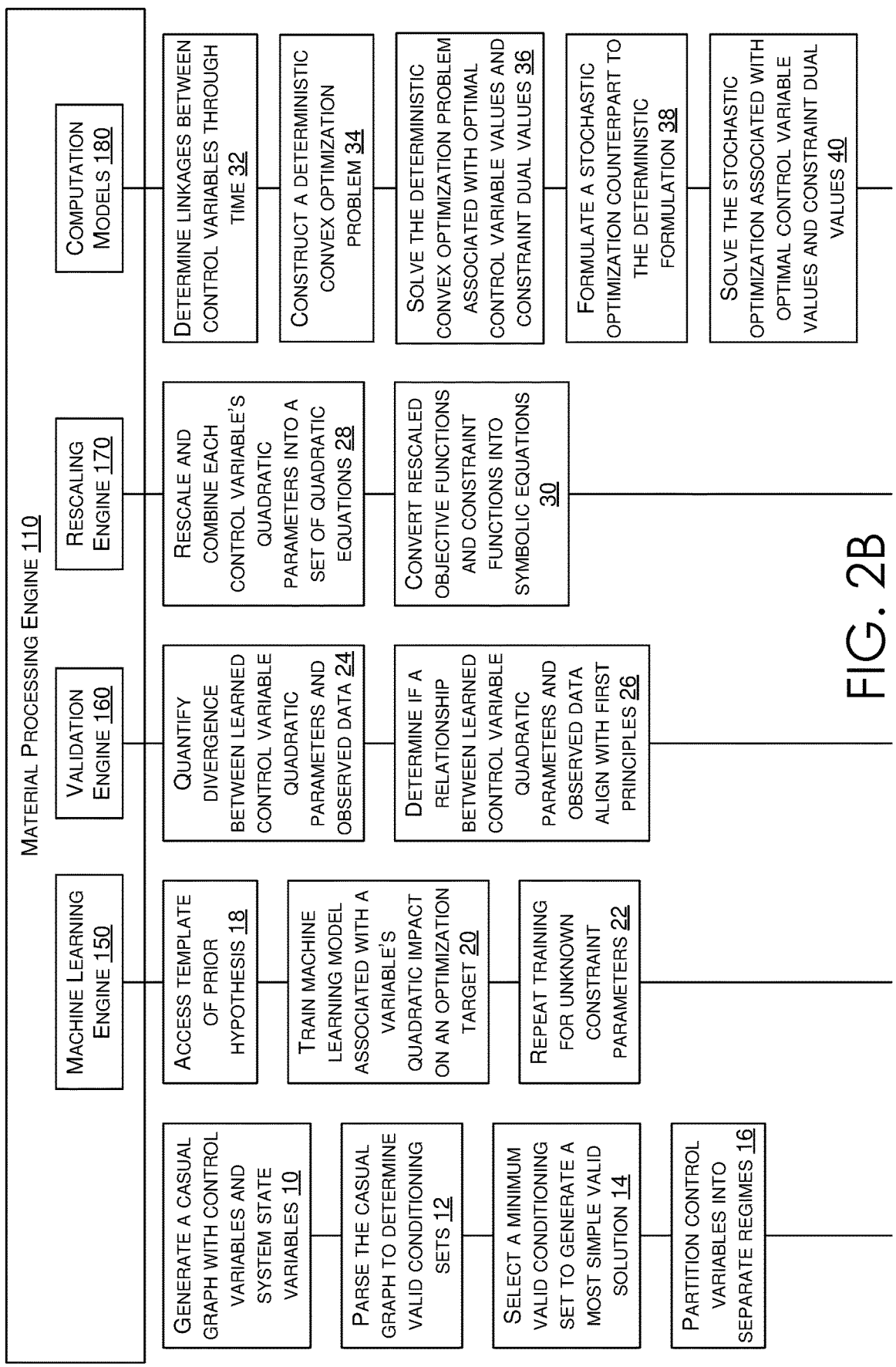
FIG. 2B is a schematic associated with an exemplary material processing system with an optimal control configuration engine, in which embodiments described herein may be employed.
Figure 2C:
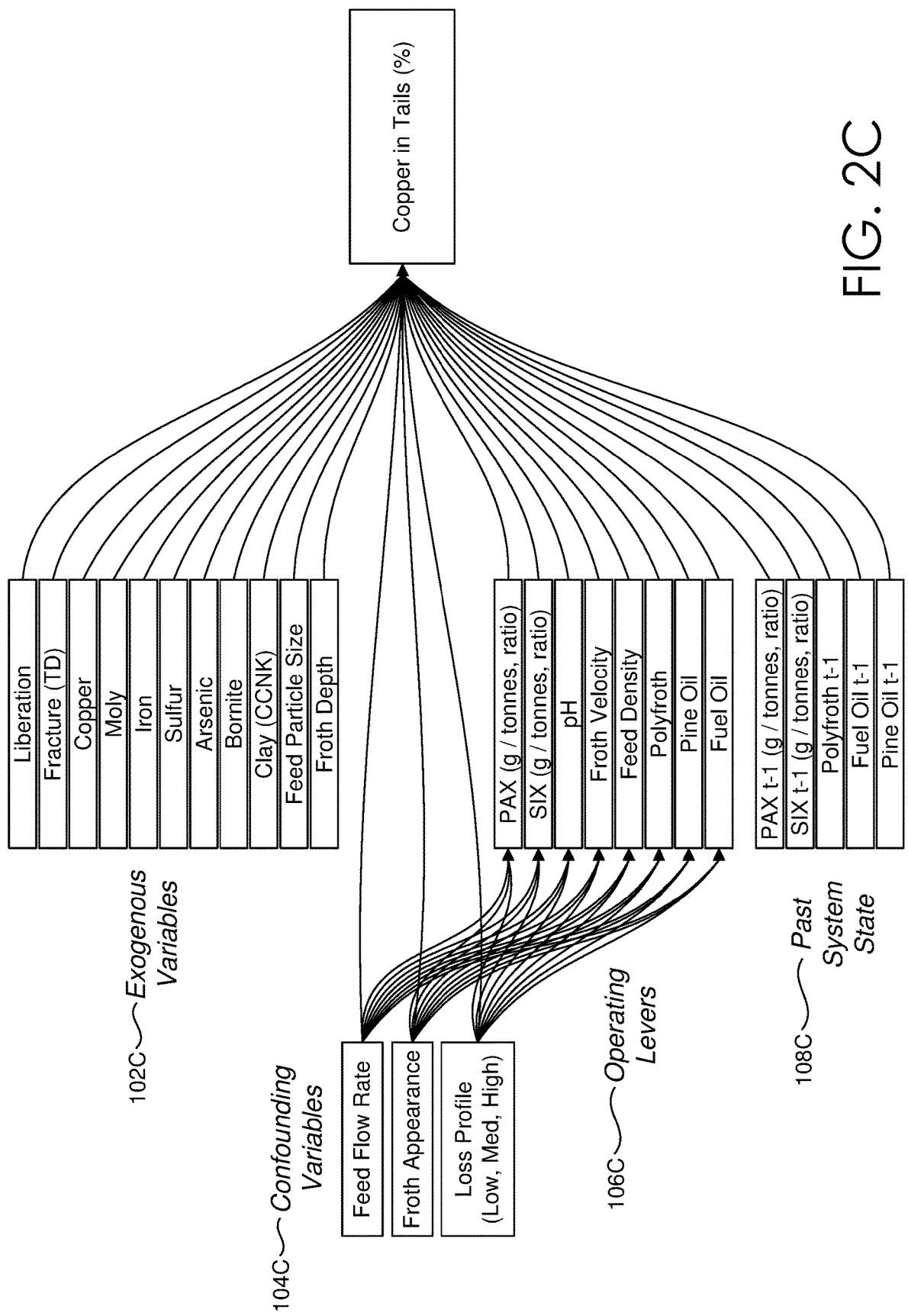
FIG. 2C is a schematic associated with an exemplary material processing system with an optimal control configuration engine, in which embodiments described herein may be employed.

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example material processing system 100 in which methods of the present disclosure may be employed. In particular, FIG. 2A shows a high level architecture of the material processing system 100 in accordance with implementations of the present disclosure. Among other engines, managers, generators, selectors, or components not shown (collectively referred to herein as "components"), the technical solution environment of material processing system 100 corresponds to FIG. 1A and 1B.

At a high level, a material processing engine can access causal graph input data. Causal graph input data can include input materials and non-experimental data of a continuous flow process. Based on the causal graph input data, a causal graph that aligns with do-calculus manipulations associated with determining identifiable causal relationships corresponding to input materials of the continuous flow process can be generated. The causal graph can be parsed based on the do-calculus manipulations to determine valid conditioning sets associated with estimating a causal impact on an optimization target. Based on the valid conditioning sets, generating the optimal control configuration comprising optimal control variable values associated with the continuous flow process.

The material processing system 100 is responsible for providing a material processing engine (e.g., material processing engine 110) for generating optimal control configurations. In particular, an optimal control configuration engine (e.g., optimal control configuration engine 110A) is configured to find controls for the material processing system 100 such that an objective function is optimized. In this way, the optimal control configuration engine 110 derives control policies, where optimal controls can include a set of differential equations that describe the paths of the control variables that minimize a cost function. The optimal control configurations (e.g., optimal control configuration 110B) include recommendations for controls for components in the material processing system. The optimal control configurations can include optimal set points that are targets or desired values for an essential variable of the continuous flow process. The optimal control configuration can be communicated to a controller interface or an operator interface where the recommended controls in the optimal control configuration are automatically or manually implemented.

With reference to FIG. 1C, FIG. 1C illustrate features associated with an optimal control configuration (e.g., optimal control configuration 110B of FIG. 2A). FIG. 1C includes exogenous variable 102C, confounding variables 104C, operating levers 106C, and past system state 108C. By way of example, consider copper recovery of copper-sulphur ore. The composition of ore entering the bulk flotation process is characterized by the first nine exogenous variables (102C of FIG. 1C). The process is further characterized by exogenous variable "Feed Particle Size," which is the result of an upstream operating lever decision, and "Froth Depth," which is measurable, but not directly controllable in the copper-sulphur recovery process. The process is further characterized by Past System State (108C of FIG. 1C). Given the characterization of the process, the Operating Levers (106C of FIG. 1C) are chosen so as to minimize the Copper in Tails (%).

As such, the material processing engine 110 can support identifying the relevant variables for a continuous flow process. The features of the optimal control configuration can be part features associated with machine learning operations (e.g., via machine learning engine 150) to train and generate causal models. A causal model can refer to a mathematical model representing causal relationships within an individual system. Casual models facilitate inferences about causal relationships from statistical data. As such, the trained causal models can be used to estimate and recommend values associated the features, in particular, based on causal relationships identified a continuous flow process relative to these features. Causal relationship or causal recommendations can be based on non-experimental training data (e.g., process non-experiment training data 140 of FIG. 2A), prior hypothesis input data (e.g., historical industry consensus data), and linkages between control variables through time (e.g., linkage through time computation model 180A) of a system state. The system state can be associated with input materials and for a particular time period. Several machine learning models can be built to quantify unobserved behavior in the continuous flow process, where the machine learning models are associated with uncertainty (via stochastic optimization) and risk adjusted recommendations. Optimization can be associated with generating and using random variables; and specifically for Stochastic problems, random variables appear in the formulation of a optimization problem itself, which involves random objective functions or random constraints.

In this way, turning to FIG. 2A, the material processing system 100 operates based on causal models and causal intervention determinations, where the causal models support inferring and representing causal relationships based on input data, and intervention determinations are based on overriding normal causal structures to force variables to take on certain values. For example, the material processing engine 110 processes historical data from a particular process to derive causal relationship between control set points and a metric to be optimized. A causal graph associated with a causal model can be generated to encode assumptions about the continuous flow process, such that, the causal graph can be parsed using do-calculus. Do-calculus can refer to a set of manipulations that are available to transform one expression into another, with the general goal of transforming expressions that contain the do operator into expressions that do not. Expressions that do not include the do operator can be estimated from observational data alone, without the need for an experimental intervention, which might be expensive or lengthy. In this way, do-calculus supports replacing probability formulas containing the do operator with ordinary conditional probabilities. It consists of three axiom schemas that provide graphical criteria for when certain substitutions may be made. Advantageously, do-calculus can support, identifying a control variable that should be controlled and eliminates a reverse causal relationships.

The material processing system 110 can receive inputs (e.g., input data 140) that support the optimal control configuration engine. The input data 140 can include process circuit design and operation data for a continuous flow process in the material processing system 100. For example, the blue prints and drawings and other suitable schematics representations that model of features of the manufacturing process (e.g., a continuous flow process). A continuous flow process can refer to continuous production to manufacture, produce, or process materials without interruption, such as by continuously in motion, undergoing chemical reactions or subject to a mechanical or heat treatment.

The material processing engine 110 supports causal graphs associated with causal mapping that identifies factors that drive a specific outcome (e.g., a mapping file). The mapping file can be manually updated (e.g., using subject matter experts) to make additional manual determinations to the mapping. The mapping file can be converted into mathematical formulations that are processed using the optimal control configuration engine to generate the optimal control configuration. In this way, the mapping file models a physical process, for example, a mining process of the material processing system. In one implementation, the data can be represented in a hierarchical data structure without the variables being on the same footing. Based on the data and the hierarchal representation, the causal graph based on do-calculus computation model is parsed to determine valid condition sets in order to estimate a causal impact of each level on the optimization target using panel data.

With reference to FIG. 2B, FIG. 2B illustrates material processing engine 110, machine learning engine 150, validation engine 160, rescaling engine 170, and computation models 180. At block 10, a causal graph is generated with control variables and system state variables. At block 12, the causal graph is parsed to determine valid conditioning sets. At block 24, a minimum valid conditioning set is selected to generate a most simple valid solution. At block 16, the control variables are partitioned into separate regimes. At block 18, the machine learning engine 150 accesses the template of prior hypotheses. At block 20, the machine learning engine 150 trains a machine learning model associated a variable's quadratic impact on an optimization target. At block 22, the machine learning engine 150 repeats the training for unknown constraint parameters.

At block 24, the validation engine 160 quantifies a divergence between learned control variable quadratic parameters and observed data. At block 26, the validation engine determines if a relationship between learned control variable quadratic parameters and observed data align with first principles. At block 26, the rescaling engine 170 rescales and combines each control variable's quadratic parameters into a set of quadratic equations. At block 28, the rescaling engine 170, converts rescaled objective functions and constraint functions into symbolic equations.

At block 32, a computation model—in the computation models 180—determine linkages between control variables through time. At block 34, a computation model constructs a deterministic convex optimization problem. At block 36, a computation model solve the deterministic convex optimization problem associated with optimal control variable values and constraint dual values. At block 38, a computation model formulates a stochastic optimization counterpart to the deterministic formulation. At block 40, a computation model, solves the stochastic optimization associated with optimal control variable values and constraint dual values.

Exemplary Methods

Figure 3:
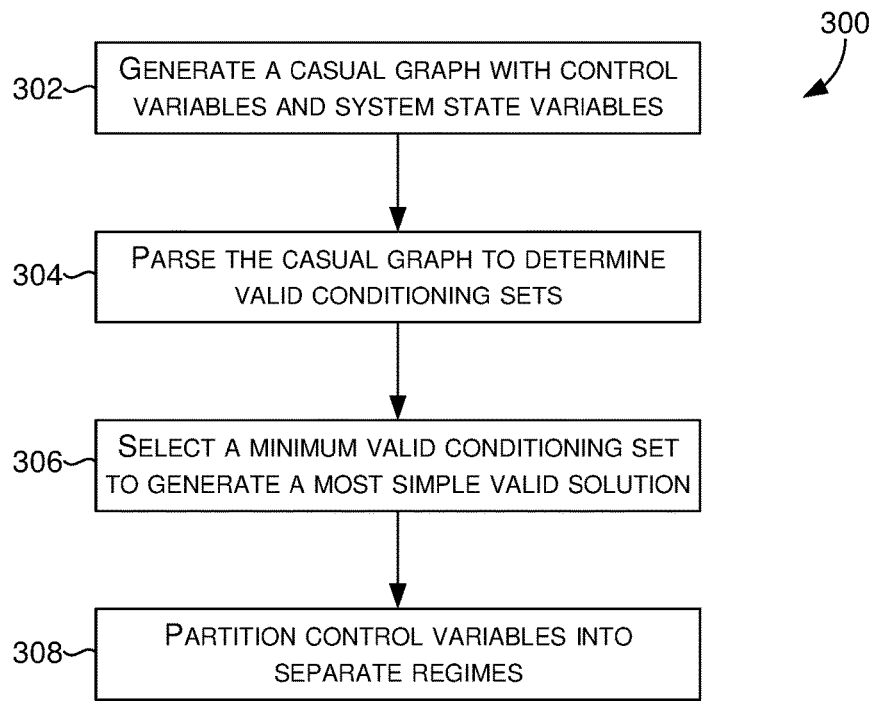
FIG. 3 is a flow diagram showing an exemplary method for implementing a material processing system with an optimal control configuration engine, in accordance with embodiments described herein.
Figure 4:
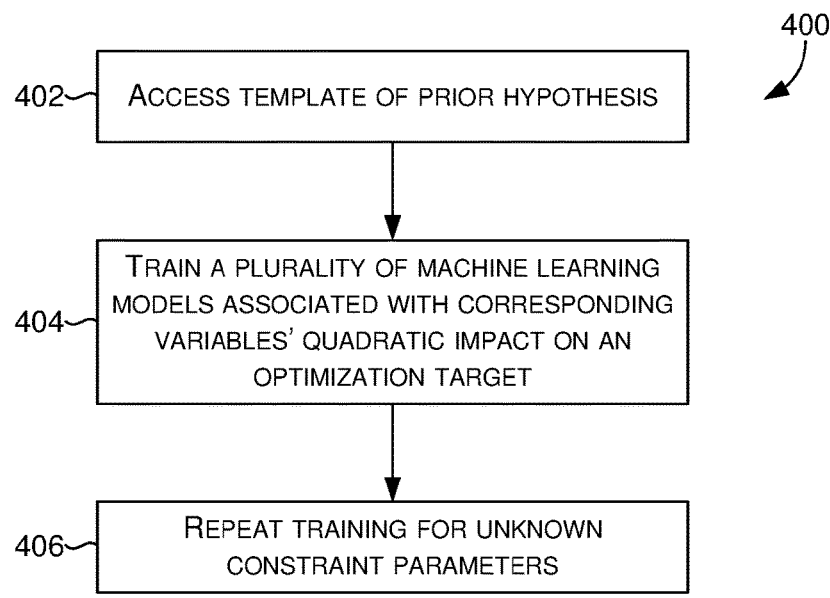
FIG. 4 is a flow diagram showing an exemplary method for implementing a material processing system with an optimal control configuration engine, in accordance with embodiments described herein.
Figure 5:
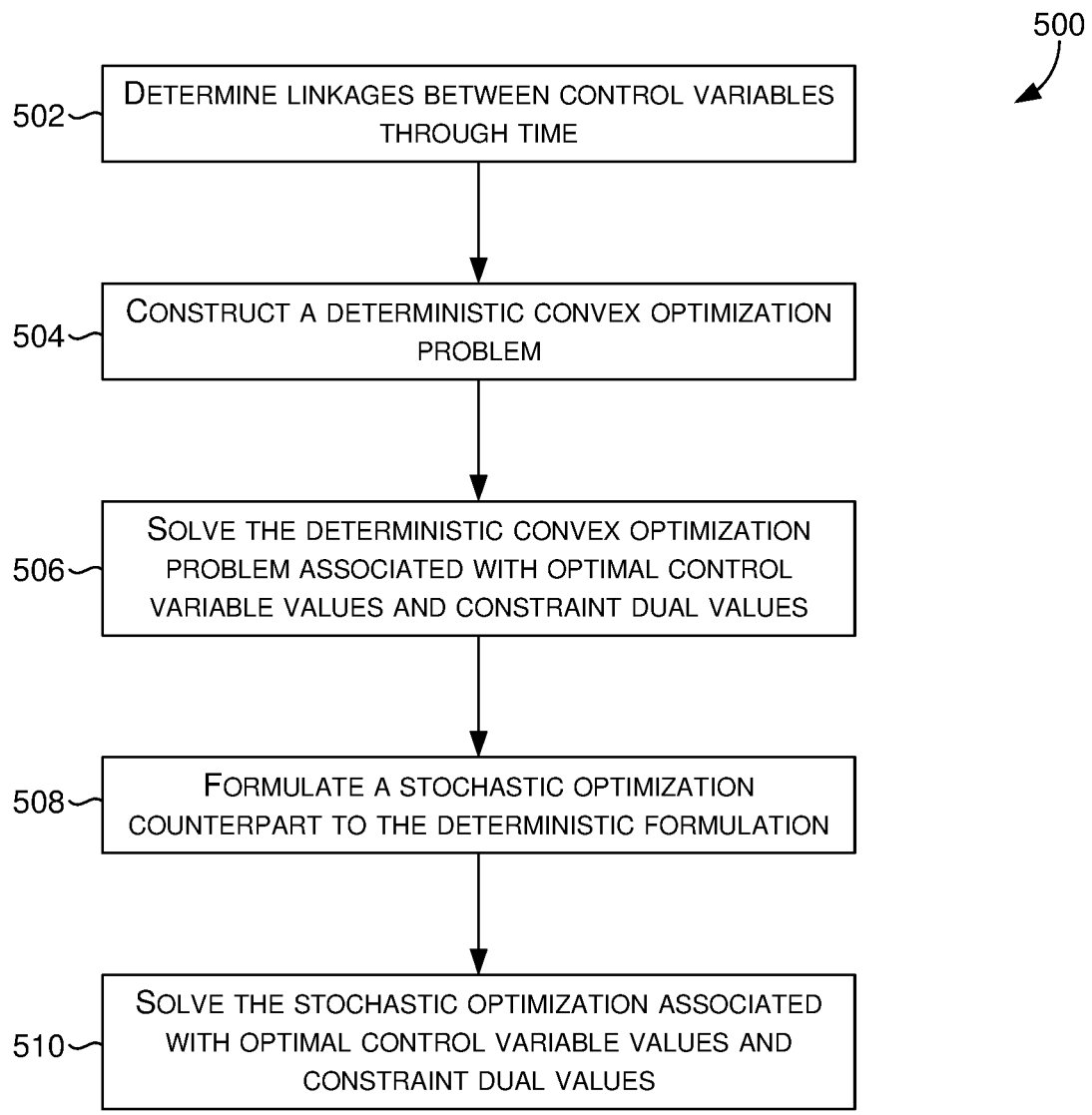
FIG. 5 is a flow diagram showing an exemplary method for implementing a material processing system with an optimal control configuration engine, in accordance with embodiments described herein.

With reference to FIGS. 3, 4 and 5, flow diagrams are provided illustrating methods for providing an optimal control configuration for an optimal control configuration engine of a material processing system. In embodiments, one or more computer-storage media having computer-executable or computer-useable instructions embodied thereon that, when executed, by one or more processors can cause the one or more processors to perform the methods (e.g., computer-implemented method) in the material processing system (e.g., a computerized system or computing system).

Turning to FIG. 3, a flow diagram is provided that illustrates a method 300 for providing an optimal control configuration for an optimal control configuration engine of a material processing system. At block 302, a causal graph—with control variables and system state variables—is generated. At block 304, a causal graph is parsed to determine valid conditioning sets. At block 306, a minimum valid condition set is set is selected to generate a most simple valid solution. At block 308, control variables are partitioned in separate regimes.

In other exemplary embodiments, the method can include accessing, at a material processing engine, causal graph input data comprising input materials associated with a continuous flow process; based on the causal graph input data, generating a causal graph that aligns with do-calculus manipulations associated with determining identifiable causal relationships corresponding to the input materials of the continuous flow process. The causal graph input data can include the following associated with the continuous flow process: a circuit-operation design schematic; a template of prior hypotheses; a set of control variables; and a set of system state variables. The template of prior hypotheses are associated with a range within which a convex minimum of a control variable of the set of control variables is quantified.

The method can further include parsing the causal graph based on the do-calculus manipulations to determine valid conditioning sets associated with estimating a causal impact on an optimization target; and based on the valid conditioning sets. Based on parsing the causal graph, partitioning control variables of the causal graph input data into a plurality of regimes comprising a first regime and a second regime. The first regime and a first control variable of the first regime, a shortest valid conditioning set is identified for training a machine learning model that predicts a quadratic causal impact of the first control variable on the optimization target.

The method also includes generating an optimal control configuration comprising optimal control variable values associated with the continuous flow process. Generating the optimal control configuration can be further based on quantifying a divergence between quadratic parameters of control variables and observed data, where a quantified divergence operates as an indication that a relationship between the quadratic parameters of a first control variable and observed data aligns with first principles. Generating the optimal control configuration can further be based on rescaling and combining quadratic parameters of control variables for a first regime comprising a first set of control variables partitioned into a first regime; and based on a symbolic computing library, converting rescaled object functions and constraint functions associated with the quadratic parameters into symbolic equations.

Generating the optimal control configuration can be further based on, using a function composition utility of the symbolic computing library, constructing nested objective functions and nested constraint functions, wherein the nested objective functions and nested constraint functions are associated with identifying linkages through time in input materials. And, generating the optimal control configuration can also be further based on constructing a deterministic convex optimization problem using a first regime comprising a first set of control variables partitioned into the first regime and an identified time period associated with a set of system state variables.

The operations of the method can further include partitioning unknown constraint parameters into a plurality additional regimes; solving the deterministic convex optimization problem and recording optimal control variables values and constraint dual values; based on solving the deterministic problem, accessing a standard deviation of a quadratic parameter of a first control variable; formulating a stochastic optimization problem that corresponds to the deterministic convex optimization problem; and solving the stochastic optimization problem and recording optimal control variables values and constraint dual values.

Turning to FIG. 4, a flow diagram is provided that illustrates a method 400 for providing an optimal control configuration for an optimal control configuration engine of a material processing system. At block 402, a template prior hypothesis is accessed. At block 404, a plurality of machine learning models associated with corresponding variables' quadratic impact on an optimization target are trained. At block 406, the training is repeated for unknown constraint parameters.

Turning to FIG. 5, a flow diagram is provided that illustrates a method 500 for providing an optimal control configuration for an optimal control configuration engine of a material processing system. At block 502, determine linkage between control variables through time. At block 504, construct a deterministic convex optimization problem. At block 506, solve the deterministic convex optimization problem associated with optimal control variable values and constraint dual values. At block 508, formulate a stochastic optimization counterpart to the deterministic formulation. At block 510, solve the stochastic optimization associated with optimal control variable values and constraint dual values.

ADDITIONAL SUPPORT FOR DETAILED DESCRIPTION OF THE INVENTION

Example Distributed Computing System Environment

Figure 6:
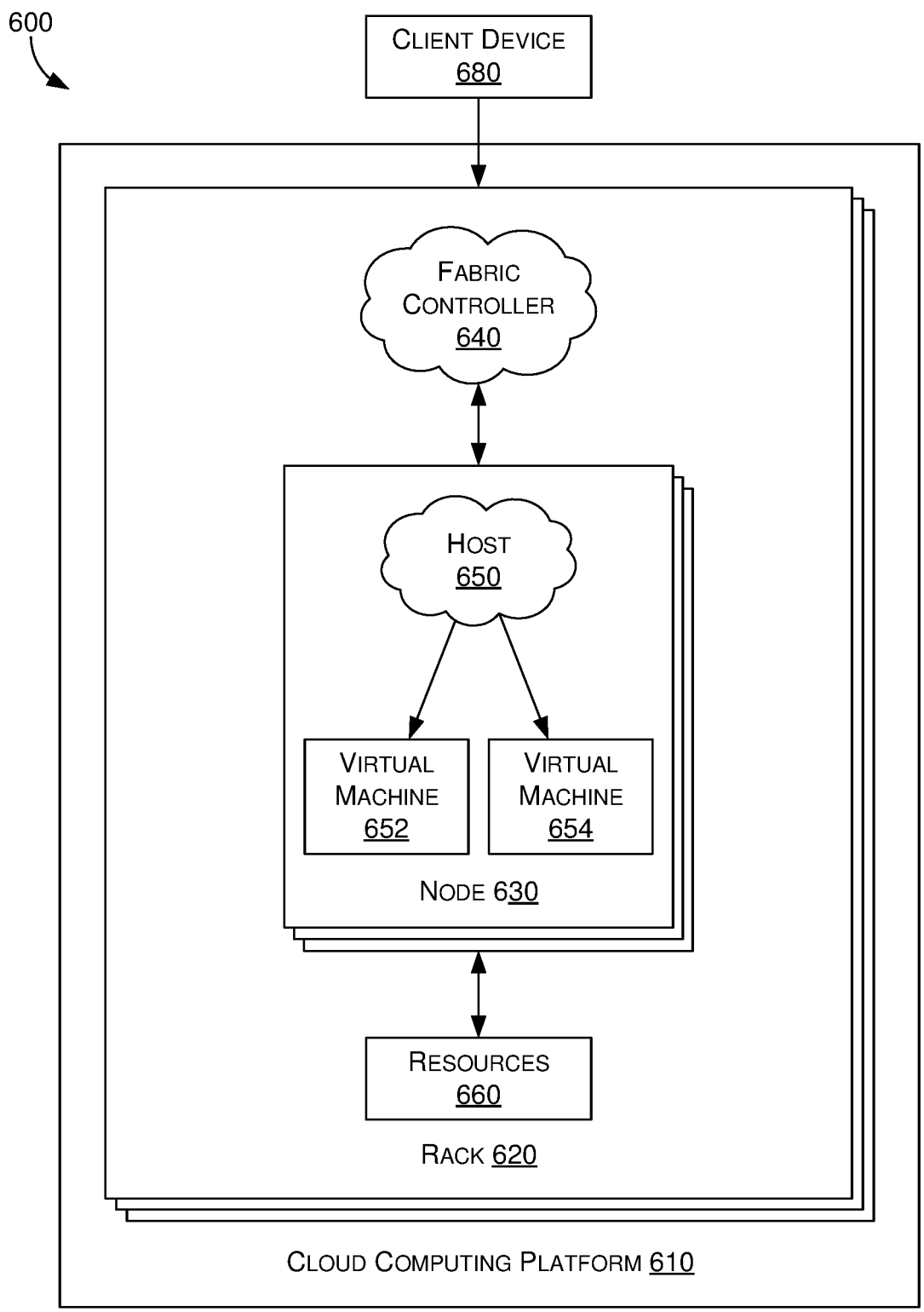
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high-level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610.

Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Distributed Computing Environment

Figure 7:
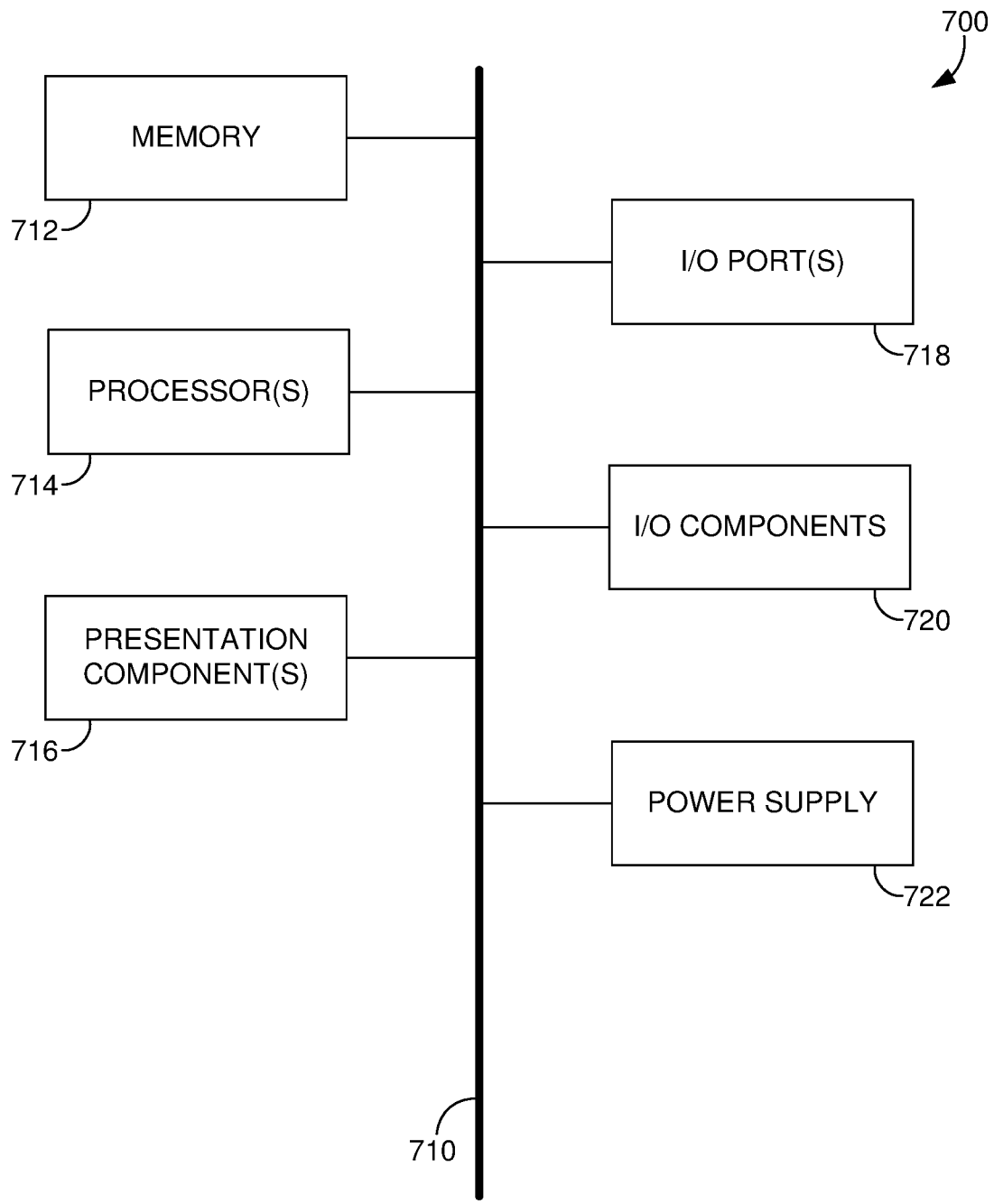
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:
accessing, at a material processing engine implemented using the one or more computer processors, causal graph input data from one or more hardware storage devices, the causal graph input data comprising input materials associated with a continuous flow process;
based on the causal graph input data, generating a causal graph that aligns with do-calculus manipulations associated with determining identifiable causal relationships corresponding to the input materials of the continuous flow process;
parsing the causal graph based on the do-calculus manipulations to determine valid conditioning sets associated with estimating a causal impact on an optimization target;
based on parsing the causal graph, partitioning a set of control variables of the causal graph input data into a plurality of regimes comprising a first regime and a second regime, wherein for the first regime and a first control variable of the first regime, a shortest valid conditioning set is identified for training a machine learning model that predicts a quadratic causal impact of the first control variable on the optimization target; and
based on the valid conditioning sets, generating an optimal control configuration comprising optimal control variable values associated with the continuous flow process; and
controlling the continuous flow process in accordance with the optimal control configuration.

2. The system of claim 1, wherein the causal graph input data further comprises the following associated with the continuous flow process:
a circuit-operation design schematic;
a template of prior hypotheses; and
a set of system state variables.

3. The system of claim 2, wherein the template of prior hypotheses are associated with a range within which a convex minimum of a control variable of the set of control variables is quantified.

4. The system of claim 1, the operations further comprising partitioning unknown constraint parameters into a plurality of additional regimes.

5. The system of claim 1, wherein generating the optimal control configuration is further based on quantifying a divergence between quadratic parameters of the set of control variables and observed data, where a quantified divergence operates as an indication that a relationship between the quadratic parameters of the first control variable and observed data aligns with first principles.

6. The system of claim 1, wherein generating the optimal control configuration is further based on:

resealing and combining quadratic parameters of the control variables for the first regime; and based on a symbolic computing library, converting resealed object functions and constraint functions associated with the quadratic parameters into symbolic equations.

7. The system of claim 1, wherein generating the optimal control configuration is further based on constructing a deterministic convex optimization problem using the first regime and an identified time period associated with a set of system state variables.

8. The system of claim 7, the operations further comprising solving the deterministic convex optimization problem and recording optimal control variables values and constraint dual values.

9. A computerized system comprising:
one or more computer processors; and
computer memory storing computer-useable instructions that, when used by the one or more computer processors, cause the one or more computer processors to perform operations comprising:
  accessing, at a material processing engine implemented using the one or more computer processors, causal graph input data from one or more hardware storage devices, the causal graph input data comprising input materials associated with a continuous flow process;
  based on the causal graph input data, generating a causal graph that aligns with do-calculus manipulations associated with determining identifiable causal relationships corresponding to the input materials of the continuous flow process;
  parsing the causal graph based on the do-calculus manipulations to determine valid conditioning sets associated with estimating a causal impact on an optimization target;
  based on the valid conditioning sets, generating an optimal control configuration comprising optimal control variable values associated with the continuous flow process,
    wherein generating the optimal control configuration is further based on, using a function composition utility of a symbolic computing library, constructing nested objective functions and nested constraint functions, wherein the nested objective functions and nested constraint functions are associated with identifying linkages through time in input materials; and
  controlling the continuous flow process in accordance with the optimal control configuration.

10. A computerized system comprising:
one or more computer processors; and
computer memory storing computer-useable instructions that, when used by the one or more computer processors, cause the one or more computer processors to perform operations comprising:
  accessing, at a material processing engine implemented using the one or more computer processors, causal graph input data from one or more hardware storage devices, the causal graph input data comprising input materials associated with a continuous flow process;
  based on the causal graph input data, generating a causal graph that aligns with do-calculus manipulations associated with determining identifiable causal relationships corresponding to the input materials of the continuous flow process;
  parsing the causal graph based on the do-calculus manipulations to determine valid conditioning sets associated with estimating a causal impact on an optimization target;
  based on the valid conditioning sets, generating an optimal control configuration comprising optimal control variable values associated with the continuous flow process,
    wherein generating the optimal control configuration is further based on constructing a deterministic convex optimization problem using a first regime comprising a first set of control variables partitioned into the first regime and an identified time period associated with a set of system state variables;
    solving the deterministic convex optimization problem and recording optimal control variables values and constraint dual values;
    based on solving the deterministic problem, accessing a standard deviation of a quadratic parameter of a first control variable;
    formulating a stochastic optimization problem that corresponds to the deterministic convex optimization problem; and
  controlling the continuous flow process in accordance with the optimal control configuration.

11. The system of claim 10, the operations further comprising solving the stochastic optimization problem and recording optimal control variables values and constraint dual values.

12. One or more computer-storage media having computer-executable instructions embodied thereon that, when executed by a computing system having a processor and memory, cause the processor to:
  access, at a material processing engine implemented using the one or more computer processors, causal graph input data from one or more hardware storage devices, the causal graph input data comprising input materials associated with a continuous flow process;
  based on the causal graph input data, generate a causal graph that aligns with do-calculus manipulations associated with determining identifiable causal relationships corresponding to the input materials of the continuous flow process;
  parse the causal graph based on the do-calculus manipulations to determine valid conditioning sets associated with estimating a causal impact on an optimization target;
  based on parsing the causal graph, partition control variables of the causal graph input data into a plurality of regimes comprising a first regime and a second regime, wherein for the first regime and a first control variable, a shortest valid conditioning set is identified for training a machine learning model that predicts a quadratic causal impact of the first control variable on the optimization target;
  based on the valid conditioning sets, generate an optimal control configuration comprising optimal control variable values associated with the continuous flow process; and
  control the continuous flow process in accordance with the optimal control configuration.

13. The media of claim 12, wherein generating the optimal control configuration is further based on:
  quantifying a divergence between quadratic parameters of control variables and observed data, where a quantified divergence operates as an indication that a relationship between learned quadratic parameters of the first control variable and observed data aligns with first principles;

solving a deterministic convex optimization problem and a corresponding stochastic optimization problem; and recording optimal control variables values and constraint dual values associated with the deterministic convex optimization problem and the stochastic optimization problem.

14. A computer-implemented method, the method comprising:

accessing, at a material processing engine implemented using one or more computer processors, causal graph input data from one or more hardware storage devices, the causal graph input data comprising input materials associated with a continuous flow process;

based on the causal graph input data, generating a causal graph associated with causal relationships corresponding to the input materials of the continuous flow process;

based on the causal graph, generating an optimal control configuration comprising an optimal control variable value associated with an optimization target of the continuous flow process, wherein the optimal control configuration comprises a first control variable value and a second control variable value, wherein the first control variable value and the second control variable value are associated with corresponding machine learning models that have learned a quadratic causal impact on the optimization target; and controlling the continuous flow process in accordance with the optimal control configuration.

15. The method of claim 14, wherein generating the optimal control configuration comprising the optimal control variable value associated with the continuous flow process is based solving a deterministic convex optimization problem and a corresponding stochastic optimization problem; and recording optimal control variables values and constraint dual values associated with the deterministic convex optimization problem and the stochastic optimization problem.

* * * * *